United States Patent [19]

Shoji

[11] 3,917,389
[45] Nov. 4, 1975

[54] MICROFICHE FILM PROJECTOR DEVICE

[75] Inventor: Akira Shoji, Yokohama, Japan

[73] Assignee: Canon Kabushiki Kaisha, Tokyo, Japan

[22] Filed: Feb. 14, 1972

[21] Appl. No.: 225,976

[30] Foreign Application Priority Data
Feb. 22, 1971 Japan.......................... 46-10320[U]
Feb. 22, 1971 Japan.......................... 46-10321[U]
Feb. 22, 1971 Japan.......................... 46-10322[U]

[52] U.S. Cl. ..................... 353/27; 353/40; 353/101
[51] Int. Cl. ..................... G03b 23/08; G03b 3/00
[58] Field of Search ..................... 353/27, 74–78, 353/22–27

[56] References Cited
UNITED STATES PATENTS

| | | | |
|---|---|---|---|
| 3,072,013 | 1/1963 | Pratt | 353/27 |
| 3,194,113 | 7/1965 | Knus | 353/75 |
| 3,320,854 | 5/1967 | Wally | 353/27 |
| 3,424,524 | 1/1969 | Akiyama | 353/78 |
| 3,442,581 | 5/1969 | Smitzer | 353/27 |
| 3,733,121 | 5/1973 | Smitzer | 353/23 |

FOREIGN PATENTS OR APPLICATIONS
1,060,345  4/1954  France................................. 353/27

Primary Examiner—Richard E. Aegerter
Assistant Examiner—A. J. Mirabito
Attorney, Agent, or Firm—Fitzpatrick, Cella, Harper & Scinto

[57] ABSTRACT

A microfiche film projector device includes an illuminating lamp, a microfiche film carrier having two transparent members displaceable together and adapted to hold a microfiche film therebetween while scanned by a fixed optical system, projection means and a projection surface. The microfiche film carrier comprises a movable frame carrying the transparent members thereon, a base frame holding the movable frame slidably in scanning direction and displaceable in a direction different from the scanning direction, and camming portions engageable by one of the two transparent members so as to space them apart from each other. The projection means includes a projection lens assembly, and a resilient holding portion for urging the lens assembly against one of the two transparent members and holding it so that when the one transparent member is spaced from the other one, the end face of the lens assembly contacting the one transparent member is displaced while keeping a uniform contact with the latter. The projector device further includes a mask member disposed adjacent to the film carrier and movable to indicate any desired portion of the miniature images on the film to be projected.

3 Claims, 17 Drawing Figures

| JUNE 1st | ORDINARY DEPOSIT |
|---|---|
| No. 1142 | ¥ 242 |
| No. 1143 | ¥ 9276 |
| No. 1144 | ¥ 396 |
| No. 1145 | ¥ 27432 |
| ~~No. 1146~~ | ~~¥ 2347~~ |
| ~~No. 1147~~ | ~~¥ 321~~ |

FIG. 11

| JUNE 1st | ORDINARY DEPOSIT |
|---|---|
| No. 1142 | ¥ 30543 |
| No. 1143 | ¥ 5325 |
| No. 1144 | ¥ 59642 |
| No. 1145 | ¥ 0 |
| ~~No. 1146~~ | ~~¥ 2341~~ |
| ~~No. 1147~~ | ~~¥ 562341~~ |

MICROFICHE FILM PROJECTOR DEVICE

BACKGROUND OF THE INVENTION

1. Field of the Invention

This invention relates to a microfiche film projector device such as microfiche film reader, microfiche film printer or microfiche film reader-printer. More particularly, the invention relates to an improved microfiche film projector device provided with microfiche film loading means for spacing a fiche film holding member apart from a corresponding member to facilitate the insertion of a fiche film into the device, mask means for permitting the corresponding areas of different frames in the fiche film to be read out during the projection thereof, and lens assembly holding means or the like for maintaining a microfiche film projection lens assembly always at a predetermined position with respect to the surface of the fiche film and for facilitating the loading of the fiche film.

2. Description of the Prior Art

It has usually been practised to record data, especially a great deal of data, in the form of highly dense miniature images on a microfilm for the purpose of reducing the space required to store such data, and when desired, to magnify and project such miniature images on a viewing screen or to print out the magnified images with the aid of a printer and provide magnified copies.

Rolls of microfilm having data images recorded thereon in arrays have been widely used for such purposes, but recent years have seen the development of a new type of filming known as "microfiche" wherein groups of images are recorded successively in a matrix-like fashion on a single sheet of film rather than on a roll of film. According to this type of filming, micro-miniature images are photographed in a matrix of rows and columns on a sheet of film.

As compared with rolled films, the microfiche film has an advantage that all correlated data can be stored in a common sheet of fiche film, which advantage in turn means a convenience with which a smaller or medium quantity of correlated data may be recorded and reproduced.

An application of such microfiche film in the banking services will now be considered as an example. In such case, it is feasible to classify numerous branch offices by district, and to record customers and their accounts such as deposits or drawn amounts in the form of successive columns or rows, thus storing the account data at each of the classified offices on a single sheet of microfiche film.

Recently, in particular, there has been developed a technique known as "COM" (computer output microfilming) whereby the outputs of a computer may be successively recorded at specific locations provided by columns or rows on a microfiche film and with a high degree of accuracy, and the advent of such system has led to an enhanced practical value of microfiche film.

To read out or print out data from such a prerecorded microfiche film, use has been made of microfiche film projector devices exclusively suitable for such purposes.

Loading a device of this type with a fiche film has been accomplished by manually opening two transparent flat members for holding the fiche film therebetween and then inserting the fiche film into the space between these two holding members. This manually operated system not only involves the procedure of opening the transparent members every time a fiche film is to be inserted, but also tends to impart damages to the surface of the film and accordingly reduce the service life thereof.

Also known are devices of the automatically operable type, which have been inconvenient in that they are extremely complex in mechanism and frequently subject to operational troubles.

A further problem exists in the masking means for enabling the read-out of the fiche film. The prior art has provided a slidable mask member as on the surface of a diverging reader screen to thereby permit the corresponding areas of different film frames to be read out. With this system, however, the displacement of the mask member is so great in amount during the adjustment of the masking that not only the operation is cumbersome but also the mask member presents a hindrance when the diverging screen is to be cleaned.

A further known device for viewing microfiche films is of such type that a lens assembly for magnifying and projecting micro-miniature images from a microfiche film is spring-biased in the direction of its optical axis so as to bear against a glass sheet for pressing and holding the fiche film thereagainst, with a predetermined spacing maintained between the surface of the fiche film and the lens assembly. The lens assembly, being so spring-biased only in the direction of its optical axis, ensures a predetermined spacing of the fiche film with respect thereto, and this may result in enlarged images clearly projected on the viewing sceen without the slightest error caused, whereas this system has raised serious problems during the insertion of fiche film as will be seen from FIG. 1 of the accompanying drawings, which shows an example of the conventional lens assembly holder means. A glass sheet $a$ for securely holding a fiche film must be raised in the manner as shown, to permit insertion of such film. When so raised, the glass sheet $a$ unavoidably strikes against one edge of a lens assembly $b$ which is resiliently biased by springs $c$, and this has often imparted damages to the glass sheet at or near the area of contact with the lens assembly $b$ because the glass sheet $a$ is required to be very thin for a good optical result. Damages imparted to such a glass sheet each time a fiche film is inserted would make the device quite unsuitable for practical use.

Figure 2A:
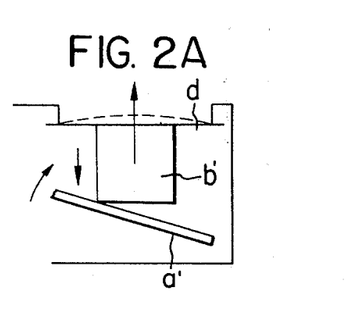
Figure 2B:
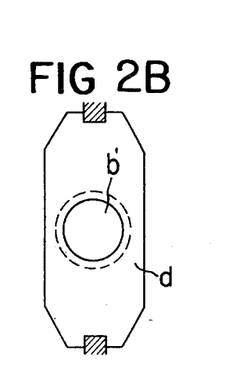
Figure 3:
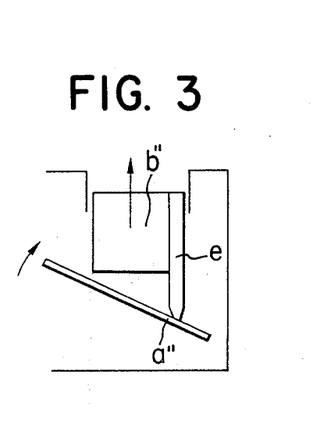

In further examples of the conventional lens assembly holder means as shown in FIGS. 2 and 3, a lens assembly $b'$ is held by a resilient plate $d$ in the middle thereof (see FIG. 2) or a lens assembly $b''$ has a rod member $e$ secured to one side wall thereof (see FIG. 3), so that the optical path through the lens assembly to the miniature-image recording surface of fiche film $a'$ or $a''$ may be maintained at a predetermined length. In either of these cases, each time it is raised to receive a fiche film, the glass sheet strikes against a portion of the lens assembly and is unavoidably damaged thereby.

SUMMARY OF THE INVENTION

It is therefore a primary object of the present invention to provide a microfiche film projector device which is excellent in operation and performance.

It is another object of the present invention to provide a microfiche film projector device which may readily be loaded with a sheet of microfiche film.

It is still another object of the present invention to provide a microfiche film projector device in which a mask member is mounted for operation in a corresponding relationship with columns or rows of miniature images recorded on a fiche film to thereby permit only a specific portion of the pre-recorded data on the microfiche film and in which after the mask member is operated once for all, the correlated data on the microfiche film may be successively read out as the film is scanned with a specific area thereof being masked.

It is yet another object of the present invention to provide a microfiche film projector device in which a lens assembly may be urged against a transparent fiche film holding member by a spring-biased holder member holding the lens assembly at one end thereof and in which when a film is to be inserted, the transparent member may be inclined so that the end face of the lens assembly to be urged against the transparent member may be brought into uniform pressure-contact with the transparent member while being displaced so as to avoid any damage imparted to the transparent member.

BRIEF DESCRIPTION OF THE DRAWINGS

The invention will be better understood from the following detailed description thereof taken in conjunction with the accompanying drawings, in which.

DESCRIPTION OF THE PREFERRED EMBODIMENTS

Figure 1:
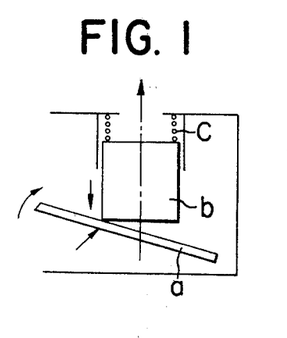
FIGS. 1, 2(A), 2(B) and 3 are schematic views showing some examples of the lens assembly holder means according to the prior art.

Reference was already had to FIGS. 1, 2 and 3 which show the lens assembly holder means according to the prior art.

Figure 4:
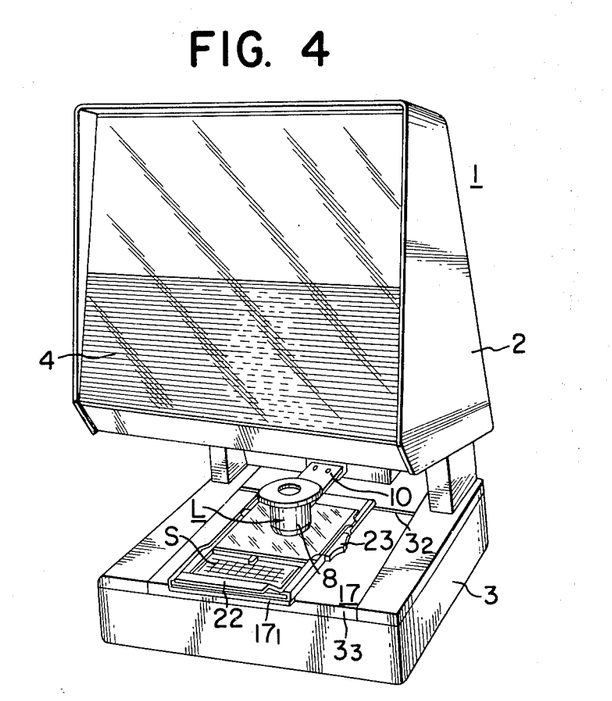
FIG. 4 is a perspective view of the entire reader to which the device of the present invention has been applied.
Figure 5:
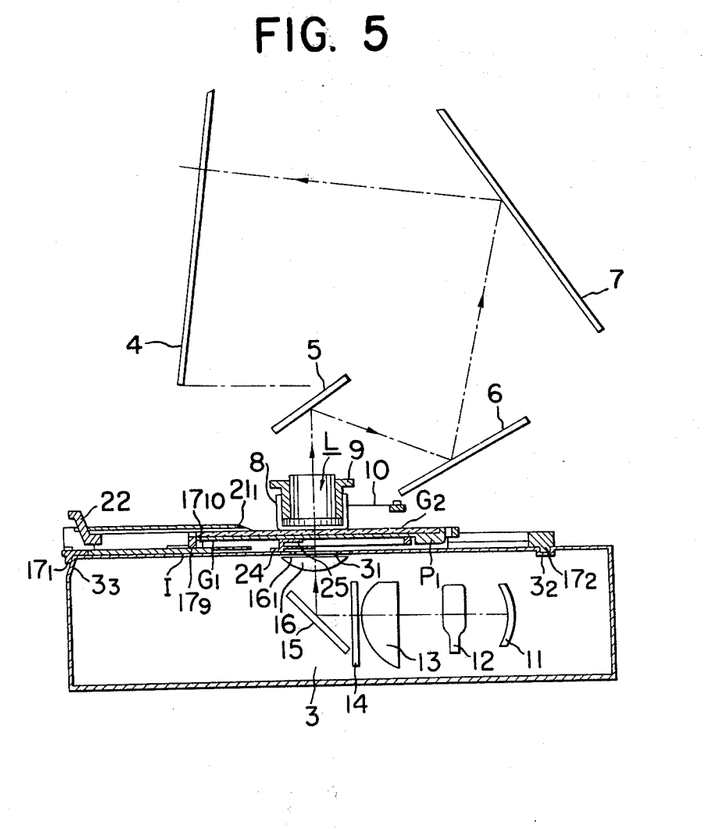
FIG. 5 is a sectional view of the reader shown in FIG. 4.

Referring now to FIGS. 4 and 5, a microreader to which the present invention is applied is generally designated by numeral 1 and includes a case 2, a base 3, and a diverging screen 4 provided on the front of the case 2. As seen in FIG. 5, the case 2 houses therein three mirrors 5, 6 and 7 disposed in opposed relationship with one another, and an image forming lens assembly L is disposed below the mirror 5.

The image forming lens assembly L is fitted in a pressure cylinder 8 loosely fitted over a tubular casing 9 for the lens assembly L, the cylinder 8 being fixed to the lower portion of the case 2 by means of a plate spring 10, as shown in FIG. 5.

Also as shown in FIG. 5, the base 3 of the reader 1 contains therein a concave mirror 11, a light source or lamp 12, a condenser lens 13, an adiabatic filter 14, a mirror 15, and a diverging lens 16 having a diverging surface $16_1$. A through-aperture $3_1$ is formed in the upper wall of the base 3 so as to correspond to the lens 16.

Figure 7A:
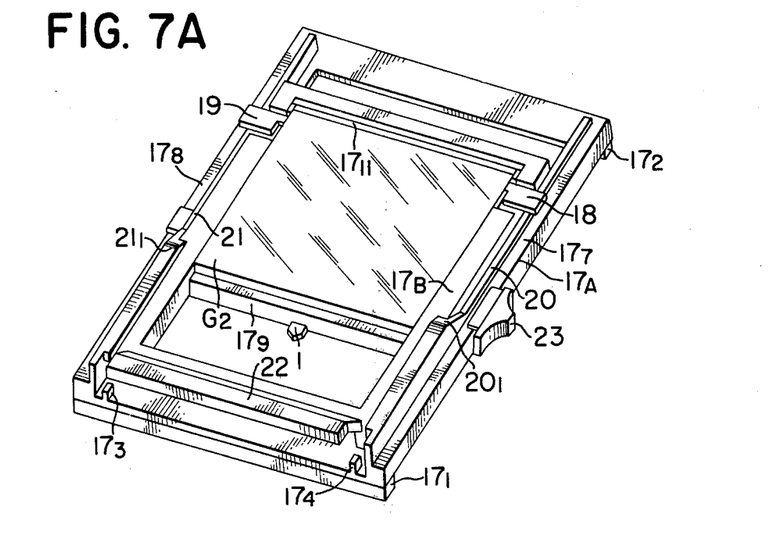
FIGS. 7A and 7B are perspective views of such film carrier.

A microfiche film carrier 17 (FIGS. 4, 7A and 7B) comprises a base frame 17A having mating projections $17_1$ and $17_2$ engaged with a guide groove $3_2$ formed on the upper and rearward surface of the base 3 of the reader and with the front edge $3_3$ of the base 3, respectively, and a movable frame 17B having guide grooves $17_5$ and $17_6$ (the latter of which is not shown) engaged by guide members $17_3$ and $17_4$ projectedly formed at the opposite ends of the front edge of the base frame 17A. The movable frame 17B has a holder member $17_9$ secured thereto which has an index member 1 secured centrally thereof, and a glass sheet G1 is fixed to the stepped portion $17_{10}$ of the frame 17B.

Figure 7B:
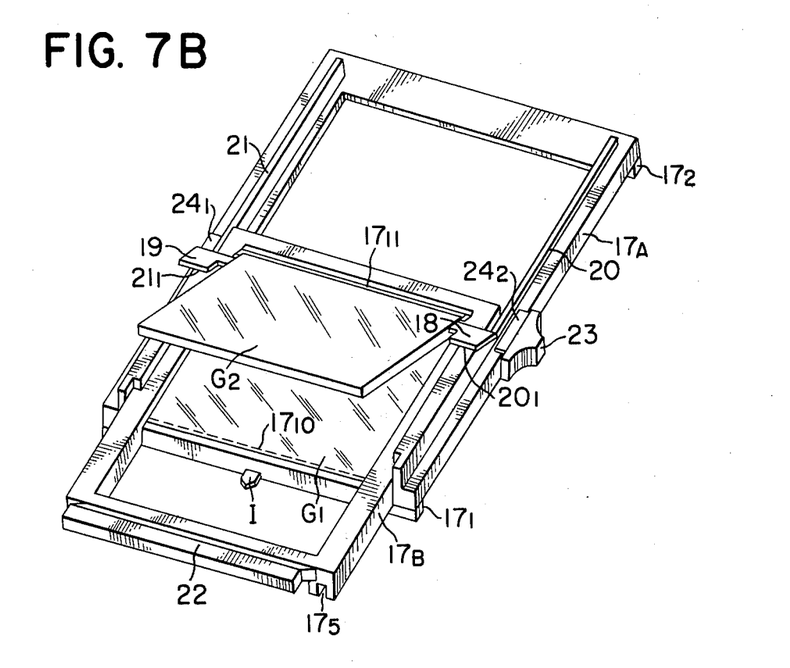
Figure 8:
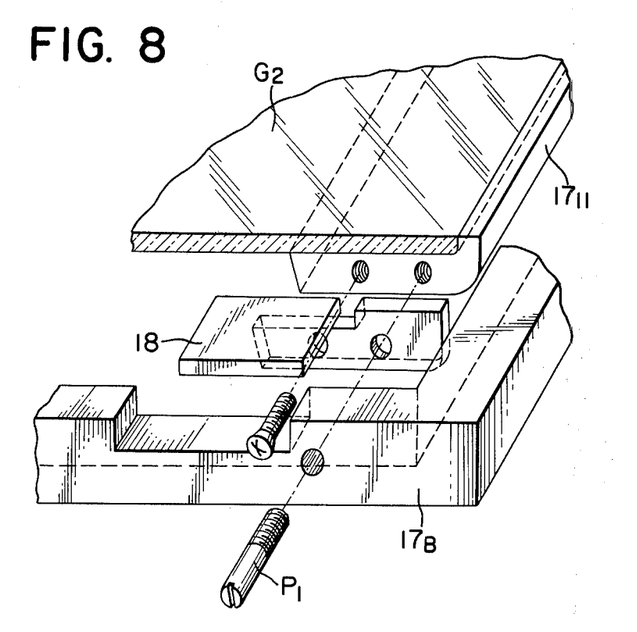
FIG. 8 is a fragmentary perspective view showing the essential portions of the film carrier shown in FIGS. 7A and B.

As shown in FIG. 8, the movable frame 17B further includes a pressure glass sheet G2 overlapping the glass sheet G1 and fixed to a pivotable member $17_{11}$ which at one side is pivotally mounted on a pivot shaft P1, so that pivotal movement of the pivotable member $17_{11}$ raises or opens the glass sheet G2 in the manner as shown in FIG. 7B, thereby permitting insertion of a microfiche film.

On the other hand, the pivotable member $17_{11}$ has slide members 18 and 19 secured thereto so as to be slidable on the opposite side walls 20 and 21 of the base frame 17A. The side walls 20 and 21 are stepped by sloped surface portions $20_1$ and $21_1$ formed on the respective side walls. An operating member 22 is formed on the movable frame 17B.

As the operating member 22 is actuated in the longitudinal direction of FIG. 4 (hereinafter referred to as "Y-direction"), the movable frame 17B is withdrawn forwardly in Y-direction with its guide grooves $17_5$ and $17_6$ guided by the guide projections $17_3$ and $17_4$ of the base frame 17A. At the same time, the slide members 18 and 19 on the pivotable member $17_{11}$ slide on the side walls 20 and 21, respectively, and when they ride onto the sloped surface portions $20_1$ and $21_1$, the pressure glass sheet G2 follows the displacement of the slide members 18, 19 caused by the sloped surface portions $20_1$, $21_1$, thereby pivotally moving the pivotable member $17_{11}$ integral with the slide members and accordingly pivotally moving the glass sheet G2. Thus, when the operating member 22 is withdrawn forwardly or in Y-direction, the pressure glass sheet G2 is automatically spaced apart from the glass sheet G1, so that a microfiche film may be quite readily inserted as will further be described.

Figure 12:
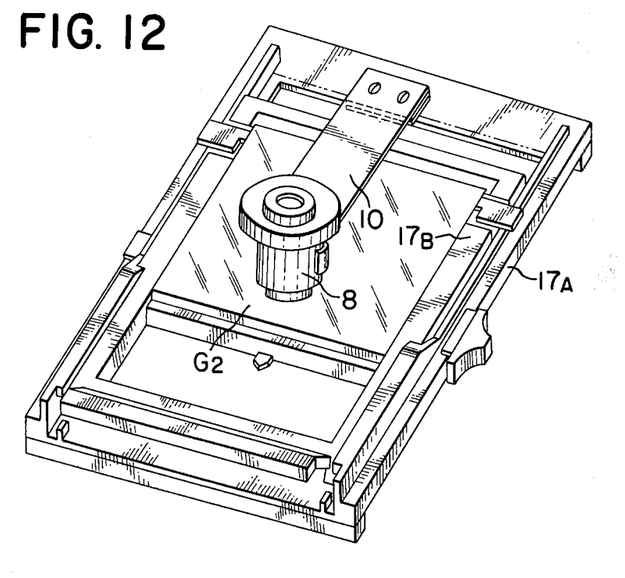
FIGS. 12 and 13 are perspective views for illustrating the relative position between the film carrier and the lens assembly in the reader of FIG. 4.
Figure 13:
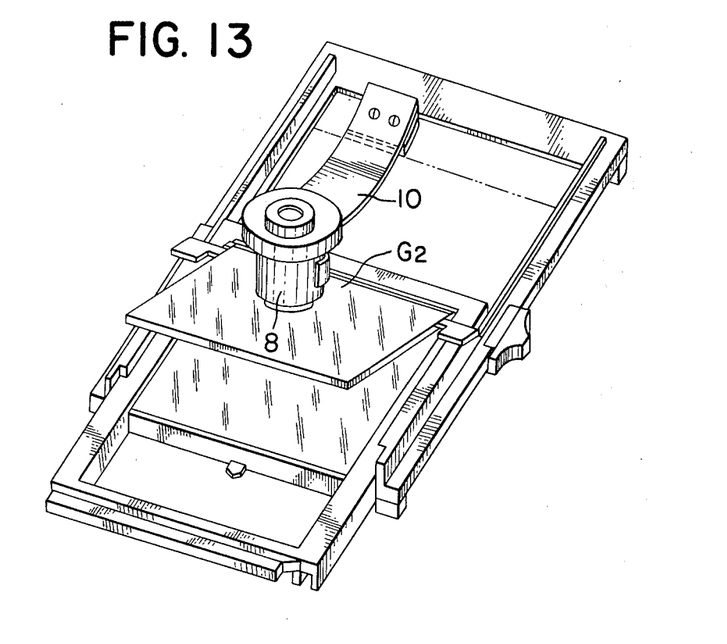
Figure 14:
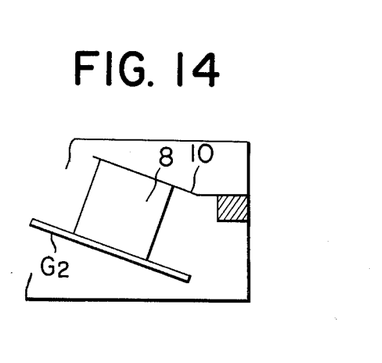
FIG. 14 schematically illustrates the operation of the lens assembly holder means according to the present invention.

The raise or opening of the glass sheet G2 also causes the lens assembly L to be raised therewith against the force of the plate spring 10 because the lens assembly is in pressure contact with the glass sheet G2 (see FIGS. 12 and 13). At that time, however, the plate spring 10 holding the lens assembly L is displaced due to its flexibility with the lower end face of the lens assembly, keeping the contact with the corresponding surface of the glass sheet G2, in the manner as shown in FIG. 14. Thus, no abnormal force is locally imparted to the glass sheet G2 and the glass sheet G2 may be entirely free of damages.

Figure 9:
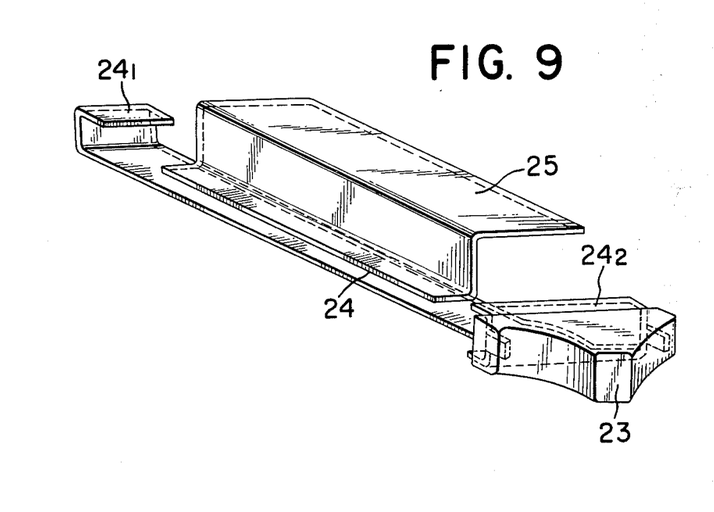
FIG. 9 is a perspective view of a mask applied to the carrier of FIGS. 7A and B.

The member designated by 23 in FIG. 4 is a mask operating member, which, as is more particularly shown in FIG. 9, is fixed to one end of a channel-shaped guide member 24. A mask plate 25 is secured to the top of the guide member 24. The mask plate 25 is disposed on the underside of the glass sheet G1 and, upon actuation of the operating member 23, it may be slidden in Y-direction with the aid of the engagement between the opposite turned-back ends $24_1$, $24_2$ of the guide member 24 and the opposite side walls of the base frame 17A (see FIG. 6).

Figure 6:
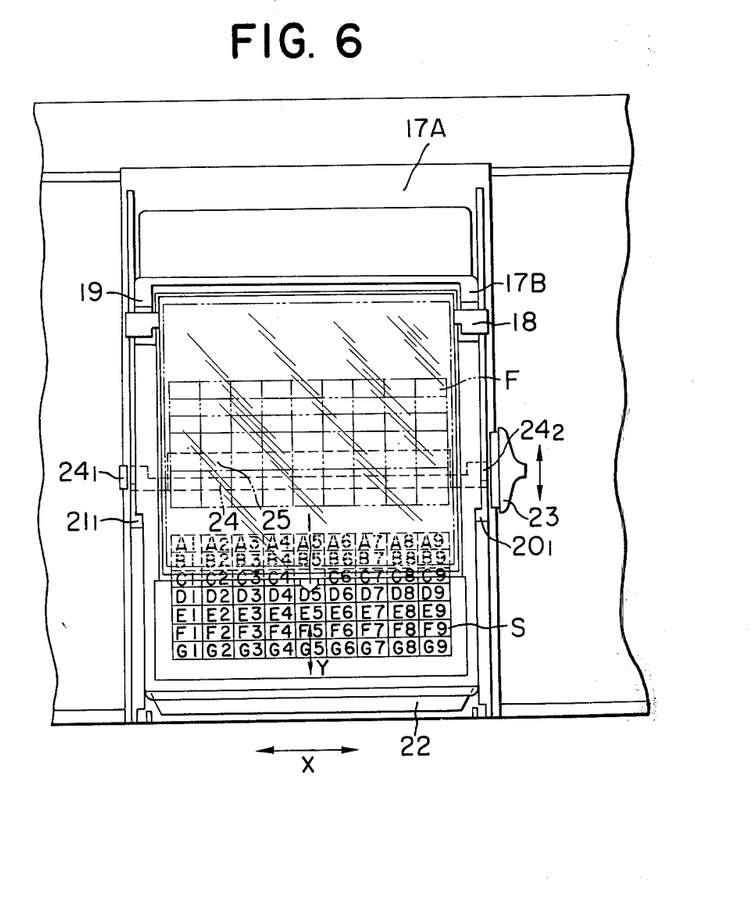
FIG. 6 is a partial top plan view of the film carrier in the reader of FIG. 4.

As shown to an enlarged scale in FIG. 6, the upper panel of the base 3 of the reader 1 has attached thereto a scale member S printed with addresses A1–A9, . . . G1–G9 corresponding to the matrix-like data recording frames in the microfiche film to be inserted into the film carrier 17. The movable frame 17B may be displaced by actuating the operating member thereof so that the index member I may be set to any desired address on the scale member S.

Each of the glass sheets G1 and G2 is formed of transparent glass material and diemsioned substantially equal to the microfiche film inserted therebetween. Therefore, when a microfiche film F is held in sandwiched relationship between the two glass sheets G1 and G2 and the lens assembly L is urged into contact with the glass sheet G2 as shown in FIG. 4, a particular address recorded in one of the recording frames of the microfiche film may be indicated on the scale S by the index member 1.

Operation of the reader having the described construction will now be discussed with respect to the case where the micorfiche film in use is one having correlated data recorded thereon in rows, e.g. a microfiche film having such data recorded in arrays corresponding to A1–A9, B1–B9, . . . G1–G9 on the scale S. The operating member 22 is first actuated forwardly in Y-direction as viewed in FIG. 4. The base frame 17A is immovable due to the guide groove $3_2$ and the front edge $3_3$ being engaged by the mating portions $17_2$ and $17_1$ respectively, and therefore the movable frame 17B is withdrawn in the same direction with the guide grooves $17_5$ and $17_6$ guided by the guide members $17_3$ and $17_4$ projectedly formed on the base frame 17A. With the forward withdrawl of the movable frame 17B, the slide members 18 and 19 formed integrally with the pivotable member $17_{11}$ of the pressure glass sheet G2 slide on the opposite side walls 20 and 21 and ride onto the slopes $20_1$ and $21_1$, whereupon the pivotable member $17_{11}$ is pivotally moved in the manner as shown in FIG. 7B. Although not shown there, the guide grooves $17_5$ and $17_6$ may then be engaged by the guide members $17_3$ and $17_4$ to stop the movable frame 17B in the position of FIG. 7B. Thus, the glass sheet G2 together with the lens assembly L has been angularly rotated to provide a space between the glass sheets G1 and G2, into which space the aforesaid microfiche film is inserted. Subsequently, the operating member 22 is moved backwardly in Y-direction, whereby the slide members 18 and 19 slide along the side walls 20 and 21 to bring the glass sheet G2 again into overlapping relationship with the glass sheet G1 with the microfiche film closely held therebetween. Thereafter, the operating member 22 is actuated to move together the base and movable frames 17A and 17B laterally or in X-direction (as viewed in FIG. 4) while the movable frame 17B alone is also moved to scan in Y-direction at the same time, until the index 1 on the movable frame 17B is registered with a corresponding address on the scale member S.

The substantially equal dimensions of the microfiche film and the glass sheets are useful in that the addresses representing the individual microminiature images recorded on the microfiche film can be registered with the corresponding addresses on the scale member S simply by placing the fiche film F in position between the two glass sheets G1 and G2. When the movable frame 17B or the base frame 17A is set to a desired address on the scale member S with the aid of the index I, the particular microfiche image which is then just below the lens L pressed against the glass sheet G2 by the plate spring 10 corresponds in significance to the address frame then indicated by the index I.

On the other hand, the lens assembly L urged against the glass sheet G2 by the force of the plate spring 10 serves to maintain a predetermined length of its optical path to the fiche film F underlying the glass sheet G2. As the result, the desired micro-miniature image on the fiche film F is illuminated by the light source 12 via condenser lens 13, filter 14, mirror 15 and diverging lens 16, and then projected in a magnified condition on the screen 4 via lens assembly L and mirrors 5, 6, 7.

It is assumed that the micro-miniature image of a particular address A1 is magnified and projected on the screen 4 in the manner as shown in FIG. 4. Then the operator can read out the projected data downwardly progressively with the operating 23 being displaced progressively in Y-direction so that all the other data than those read out are masked or covered by the mask 25.

Figure 10:
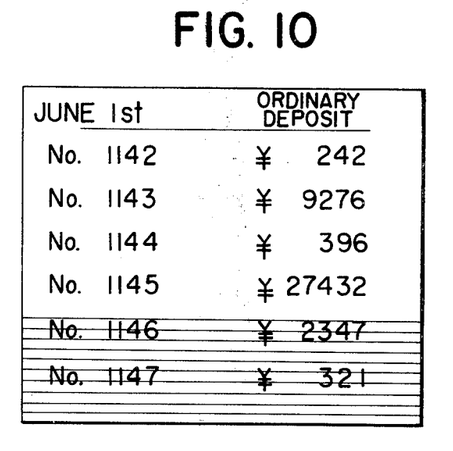
FIGS. 10 and 11 show some examples of the image appearing on the screen of the reader shown in FIG. 4.

Although FIG. 10 shows only seven rows of data, the number of such rows may be increased without causing any error in identifying between the individual rows, because as shown in FIG. 10, each individual row of data representing the consecutive number and amount of ordinary deposit can be seen in a distinct line with the aid of the mask 25 which shadows the other rows of data still left to be read.

Figure 11:
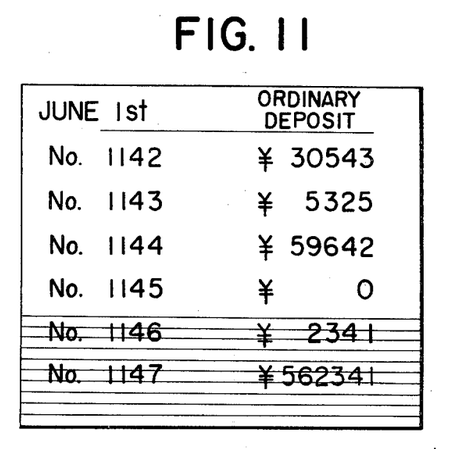

In order to view the micro-miniature image of a subsequent related address A2, the operating member 22 may be actuated in X-direction until the index member I is registered with that address A2, whereby a magnified picture as shown in FIG. 11 will appear on the screen 4.

Adresses A1 and A2 are correlated together and in FIGS. 10 and 11, each address represents the data such as amount of ordinary deposit and ordinary deposit balance for individual customers No. 1142 to No. 1147.

If it is desired to read both the amount of ordinary deposit and its balance for a customer No. 1145, for example, then the operating member 22 may be displaced in X-direction until the index I is registered with the address A1 and then with the address A2 on the scale member S. whereby the magnified pictures as shown in FIGS. 10 and 11 will appear successively on the screen 4. In this case, the mask 25 does not displace its position and the successive micro-miniature images up to the desired customer No. 1145 appear on the screen with the rest of the data masked.

Thus, the viewer can correctly read out the amount of deposit and deposit balance for the desired customer No. 1145 as these data appear in a line above the masking edge. At the same time, the accuracy of the read-out can be enhanced because of the masking effect for the undesired data portions.

As has been described above, the present invention has great practical advantages in that when the operating member for the film carrier is withdrawn out of the scanning range, the sloped surface portions formed in the base frame serve to separate the fiche holding glass sheet from the other glass sheet to thereby facilitate the insertion of the fiche film.

While the above-described embodiment has been shown to employ sloped surface portions formed in the base frame to separate the transparent holding glass sheet, such separation may also be achieved by projected portions provided by separate members formed discretely from the base frame.

Further, the present invention has been described as being applied to a reader, whereas it is also possible to apply the invention to a reader-printer having a printer to obtain printed copies in which only the desired portion of correlated data is printed out and predetermined items in the various data are indicated by masking lines.

Furthermore, the mask operating member 23 has been shown as being displaceable in Y-direction, but it may be designed for displacement in X-direction without any inconvenience resulting therefrom. Also, the mask 25 may alternatively be of the slit type which permits only predetermined items of the magnified images to appear on the screen while masking the other data.

It will thus be appreciated that according to the present invention, a mask member for masking columns or rows of micro-miniature images recorded in a matrix-like fashion on a microfiche film is operably mounted so that the micro-miniature images on the microfiche film representing correlated data may be scanned and read out in the sequence of the columns or rows simply by adjusting the mask member to a desired position. In this way, accurate read-out of any desired data can readily be achieved with undesired data portions duly masked through a very simple operation.

Figure 15:
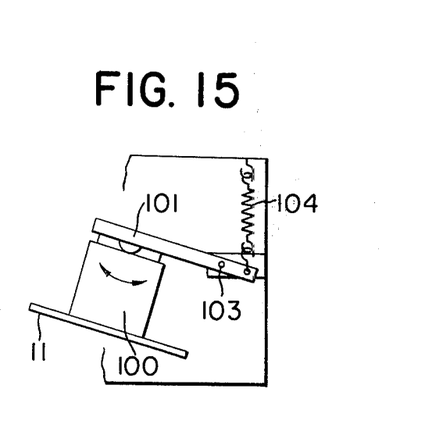
FIG. 15 shows a modification of the lens assembly holder means according to the present invention.

Although the above-described embodiment has employed a single plate spring to hold the lens assembly, the same result as that achieved thereby may be attained by an alternative arrangement as shown in FIG. 15, wherein lens assembly 100 is attached to holder member 101 so as to be rockable in oblique direction with respect to the fiche film, the holder member 101 having the other end thereof pivoted to a case by means of pin 103 and biased upwardly by spring 104.

According to this latter embodiment of the present invention, the lens assembly is rockably held at one end thereof and the transparent pressure member for holding the fiche film is displaceable with the lens assembly to an oblique position with respect to the fiche film when it is inserted. Thus, the fiche film holding member can be protected from the damages which would otherwise be imparted thereto during the insertion of the fiche film, and in addition, the lens assembly is always ensured to be positioned at a predetermined operative position with respect to the micro-miniature images recorded on the fiche film.

I claim:
1. A microfiche film projector device comprising:
an illumination light source;
a projection surface; and
a microfiche film carrier having two transparent members for retaining a microfiche film therebetween, whereby said microfiche film is scanned by a fixed optical system;
said microfiche carrier comprising a movable frame for supporting said transparent members, a base frame for slidably supporting said movable frame in a scanning direction and shiftable in the direction opposite to said scanning direction, a mask member disposed adjacent to said film carrier and movable to indicate a desired portion of the image-bearing surface of the film to be projected, said mask being slidably mounted on said base frame.

2. A microfiche film projector device according to claim 1, wherein said mask member has a slit formed therethrough.

3. A microfiche film projector device including an illuminating light source, a microfiche film carrier having two transparent members displaceable together, said transparent members being adapted to hold a microfiche film therebetween while being scanned by a fixed optical system, projection means and a projection surface, characterized in that said projection means includes:
a projection lens assembly; and
a resilient holding portion for urging said lens assembly against one of said transparent members, said resilient holding portion being adapted to hold said lens assembly in such a manner that when said one transparent member is spaced apart from the other transparent member, the end face of said lens assembly which contacts said one transparent member is displaced while keeping a uniform contact with the latter; and
wherein said resilient holding portion comprises a holder member having opposite ends for holding said lens assembly and one end of a tension spring secured to the body of said device, and a member for pivotally supporting said holder member between said opposite ends thereof.

* * * * *